(12) United States Patent
Alsehly et al.

(10) Patent No.: US 9,602,960 B2
(45) Date of Patent: Mar. 21, 2017

(54) POSITIONING METHOD

(71) Applicant: SENSEWHERE LIMITED, Edinburgh (GB)

(72) Inventors: Firas Alsehly, Edinburgh (GB); Zankar Upendrakumar Sevak, Edinburgh (GB); Tughrul Sati Arslan, Edinburgh (GB)

(73) Assignee: SENSEWHERE LIMITED, Edinburgh (GB)

( * ) Notice: Subject to any disclaimer, the term of this patent is extended or adjusted under 35 U.S.C. 154(b) by 0 days.

(21) Appl. No.: 14/346,469

(22) PCT Filed: Sep. 21, 2012

(86) PCT No.: PCT/GB2012/052352
§ 371 (c)(1),
(2) Date: Mar. 21, 2014

(87) PCT Pub. No.: WO2013/041885
PCT Pub. Date: Mar. 28, 2013

(65) Prior Publication Data
US 2014/0243025 A1 Aug. 28, 2014

Related U.S. Application Data

(60) Provisional application No. 61/649,980, filed on May 22, 2012.

(30) Foreign Application Priority Data

Sep. 22, 2011 (GB) .................................. 1116374.8

(51) Int. Cl.
*H04W 24/00* (2009.01)
*H04W 4/02* (2009.01)
(Continued)

(52) U.S. Cl.
CPC ............. *H04W 4/02* (2013.01); *G01S 5/0205* (2013.01); *G01S 5/14* (2013.01)

(58) Field of Classification Search
CPC ...... H04W 64/00; H04W 4/02; H04W 64/003; H04W 48/20; H04W 4/025; H04W 64/006; H04W 88/08
(Continued)

(56) References Cited

U.S. PATENT DOCUMENTS 8,200,251 B2 6/2012 Huang
8,700,060 B2 4/2014 Huang
(Continued)

FOREIGN PATENT DOCUMENTS

CN 101 620 270 1/2010
CN 101620270 1/2010
(Continued)

OTHER PUBLICATIONS

International Search Report issued for PCT/GB2012/052352, mailed Dec. 14, 2012.

*Primary Examiner* — Kwasi Karikari
(74) *Attorney, Agent, or Firm* — Nixon & Vanderhye P.C.

(57) ABSTRACT

There is disclosed a method of estimating the position of a user device (902), the method comprising: receiving signal data from a plurality of electromagnetic signal sources (W) having known locations; dividing the plurality of electromagnetic signal sources (W) into a plurality of groups ($G_1$, $G_2$, $G_3$, $G_4$, $G_5$) of the signal sources; processing the received signal data to generate group position data representing the position of at least one group location (910, 912, 914, 916, 918), each group location being characteristic of the location of a respective group of the signal sources; and processing the group position data to generate position data representing an estimate of the position of the user device (902); and outputting the position data.

40 Claims, 9 Drawing Sheets

(51) Int. Cl.
*G01S 5/14* (2006.01)
*G01S 5/02* (2010.01)

(58) Field of Classification Search
USPC .......................................... 455/457
See application file for complete search history.

(56) References Cited

U.S. PATENT DOCUMENTS

| | | | |
|---|---|---|---|
| 2008/0161011 A1* | 7/2008 | Babin | H04W 64/00 455/456.1 |
| 2010/0324813 A1 | 12/2010 | Sundararajan et al. | |
| 2011/0143770 A1 | 6/2011 | Charbit et al. | |
| 2011/0205125 A1 | 8/2011 | Lin et al. | |
| 2012/0133555 A1 | 5/2012 | Hyun | |
| 2012/0157123 A1 | 6/2012 | Li et al. | |
| 2012/0170560 A1* | 7/2012 | Han | G01S 5/0252 370/338 |

FOREIGN PATENT DOCUMENTS

| | | |
|---|---|---|
| JP | 2001-333445 | 11/2001 |
| TW | I298799 | 7/2008 |
| TW | 200841036 | 10/2008 |
| TW | I331224 | 10/2010 |
| WO | 2010/075369 | 7/2010 |
| WO | 2011/047310 | 4/2011 |
| WO | 2011/127659 | 10/2011 |
| WO | 2012/082828 | 6/2012 |

\* cited by examiner

POSITIONING METHOD

This application is the U.S. national phase of International Application No. PCT/GB2012/052352, filed 21 Sep. 2012, which designated the U.S., and claims priority to GB Application No. 1116374.8 filed 22 Sep. 2011, and claims the benefit from U.S. Provisional Application No. 61/649,980, filed 22 May 2012, the entire contents of each of which are hereby incorporated by reference.

FIELD OF THE INVENTION

The present invention relates to a method for estimating the position of a user device. Some embodiments also concern estimating the position of an electromagnetic signal source.

BACKGROUND TO THE INVENTION

A large number of electromagnetic signal sources are located in populated areas, such as Wireless Access Points (WAPs) of Wi-Fi networks, mobile phone towers, Bluetooth® beacons, and so on. Wireless technology-based positioning systems, and Wi-Fi positioning systems in particular, can provide an estimate of a user's position based on properties of signals received from such signal sources, such as signal strength, and further information, typically stored in a database, that provides a location for each signal source.

Such electromagnetic signal sources, and WAPs in particular, are often not uniformly distributed. Often WAPs may be clustered in particular buildings and/or on particular floors, which in practice can reduce the accuracy of the systems.

FIGS. 1A and 1B illustrate one aspect of this problem. In FIG. 1A, a user device 102 can detect signals from a single WAP 104 in one building and a cluster of WAPs 106, 108, 110 in another building. One of the building walls 114 may be relatively thin and/or permeable to Wi-Fi signals, and the other wall 116 may be relatively thick and/or impermeable, for example. The attenuation of the Wi-Fi signals from the WAPs 104, 106, 108, 110 can be computed and used to estimate the distance between the user terminal and the WAPs, which can in turn be used to estimate the position of the user terminal 102. FIG. 1B illustrates how the geometry of the WAPs may appear from the point of view of the position estimation software. In this case the length $L_2$ may appear to be greatly exaggerated compared to the length $L_1$, for example, due to locally high attenuation of the signals from the WAPs 106, 108, 110 in the vicinity of the user terminal 102. Various techniques can be used to refine the position estimates based on assumptions and/or prior knowledge of the environment in the vicinity of the user terminal 102, and signal propagation effects can to a degree cancel out, but in a case such as this the clustering of WAPs 106, 108, 110 can make the position estimate more susceptible to systematic errors (such as a locally thicker stretch of wall and the like) or can otherwise skew the position estimate due to a highly non-uniform distribution of signal sources around the user terminal 102.

Further problems arise in that the accuracy of data in positioning system databases can vary considerably, and the amount of data that is required to be stored in order to provide properly calibrated positioning data for all detectable WAPs and other signal sources can impose a serious burden in terms of bandwidth, storage capacity and the processing power that is required to generate position estimates. The present invention seeks to address these and other problems in the prior art.

SUMMARY OF THE INVENTION

A first aspect of the invention provides a method of estimating the position of a user device, the method comprising: receiving signal source data from a plurality of electromagnetic signal sources having known locations (alternatively known herein as "reference points"); dividing the plurality of electromagnetic signal sources into a plurality of groups of the signal sources; processing the received signal source data to generate group position data representing the position of at least one group location (alternatively known herein as "leader points"), each group location being characteristic of the location of a respective group of the signal sources; and processing the group position data to generate position data representing an estimate of the position of the user device; and outputting the position data. The electromagnetic signal sources may for example include Wi-Fi Wireless Access Points (WAPs), Bluetooth transmitters, optical (such as infra-red) communication devices and electromagnetic/wireless beacons of various sorts. In some embodiments, the electromagnetic signal sources are either or both wireless LAN network access points (e.g. WAPs) and wireless beacons.

By dividing the plurality of electromagnetic signal sources into groups and then processing group position data to generate a position estimate, a less computationally intensive positioning method can be provided. Regardless, there may be only one signal source in each group, but preferably there is more than one in at least the majority of groups. Processing the group position data to generate position data typically (but not necessarily) comprises processing both the group position data and the signal source data. The group position data is not limited to data representing group locations but may also for example include data representing signal characteristics of signal sources, average signal strength and variance, data regarding the number of type of sources in a group, and so on. The term 'signal source data' may connote essentially any kind of data concerning the signal sources; the signal source data may typically comprise data concerning the strength of signals received from electromagnetic signal sources, and may comprise data received from the electromagnetic signal sources themselves such as identifiers of the sources. The signal source data furthermore may include or consist of non-position related data, such as identities of detected signal sources, with or without signal strength data, for example.

In one example, the group position data represents the position of a plurality of group locations corresponding to the plurality of groups. That is to say, each of the groups has a corresponding group location encoded in the group position data.

The method may further comprise either selecting said at least one group location (prior to processing the received signal source data) or generating said at least one group location (again, prior to processing the received signal source data), wherein processing the received signal source data comprises generating group position data in dependence on said selected/generated at least one group location. In a more specific case, the method may comprise selecting (or generating) a plurality of group locations, and processing the received signal source data to generate group position data representing the position of at least one said group location.

Advantageously, the plurality of electromagnetic signal sources may be divided into groups such that the distribution of the plurality of group locations is generally more uniform than the distribution of the plurality of electromagnetic signal sources. This can reduce systematic errors caused by clustering of signal sources in one general direction, for example, and can in general provide more unbiased position estimates.

At least one group location may be substantially equivalent to the location of an electromagnetic signal source in the respective group. In this instance only the location of said signal source needs to be ascertained, reducing the amount of information required to be accessed and/or stored. This can be advantageous if one signal source in a group is a particularly high quality and/or reliable source (for example in terms of signal strength, uniformity of propagation, availability, and so on), or if all signal sources are similar and essentially interchangeable from the point of view of positioning.

Alternatively or additionally, at least one group location may be derived from the locations of a plurality of the electromagnetic signal sources in the respective group. This may be considered to be a 'virtual group location'. The group location may for example be derived from a mean or median average of some or all the signal sources in the group, or some other calculation. This can require more computing power but can reduce certain types of estimation error as a result.

The method may further comprise selecting said at least one group location by accessing stored group data (for example in a local or remote database), and selecting said at least one group location from the stored group data. Thus groups can be pre-determined and the user terminal can for example be instructed to detect only signal sources relating to these pre-determined group locations, for example in response to the user terminal reporting an approximate location. This can reduce network bandwidth in variants where the position estimates are carried out at a location remote from the user terminal, because data regarding fewer signal sources are measured and transmitted.

As suggested above, the method may further comprise transmitting to a server data associated with the location of the user device, and receiving from the server a selection of one or more group locations, or else using a local database. The data associated with the location of the user device may for example be at least one of: a determined approximate position of the user device, a user input relating to the local environment (such as a user assessment of the location of the device), at least a portion of the received signal data, and data derived from the received signal data.

In an alternative embodiment, the method may further comprise generating said at least one group location in dependence on the received signal data (that is, dynamically determining the group locations rather than, for example, retrieving pre-determined group location data from a database).

In this embodiment, generating said at least one group location preferably comprises selecting a datum point (which may be considered a 'pilot point'), the plurality of signal sources being divided into groups with respect to the datum point.

For example, the plurality of signal sources may be divided into groups by at least one dividing line passing through the datum point. The lines may be perpendicular and may for example be parallel to lines of latitude and longitude.

In a further example, the plurality of signal sources may be divided into groups by a plurality of dividing lines extending radially from the datum point. This can form a number of radial sectors, which may for example be evenly spaced so as to increase the uniformity of the estimate.

In relation to the datum point, the method may further comprise selecting the datum point in dependence on user input, such as a selection of a position on a map. Alternatively or additionally, the method may further comprise receiving further signal data from a further device (such as a further user device or any other wirelessly communicating consumer or other electronic device, for example, including mobile phones, wireless-enabled laptops, tablet computers, Bluetooth® beacons, and so on) in the vicinity of the user device, determining the position of the further device in dependence on the further signal data, and selecting the datum point in dependence on the determined position of the further device. The further signal data may explicitly describe the position of the further device, and may for example be a position estimated at the further device in accordance with the estimation method as aforesaid. Thus a network of devices may reduce the overall computational and/or network load required to estimate the position of all of the devices, for example. The further signal data may otherwise allow the position of the further device to be computed indirectly, for example using signal strength range-finding and/or triangulation relating to the carrier signal of the further signal data or, more indirectly, by computation carried out on data contained in the further signal data relating to signals received at the further device, and the like.

At least one group of signal sources may have a plurality of group locations associated with it. There may be a preferred group location which is normally used and 'backup' group locations where are normally not, or the multiple group locations may be treated equally and all used in the position estimate computation.

The method may further comprise receiving signal source position data representing the position of each of the plurality of electromagnetic signal sources. The data may be received from a database, for example. By assessing the positions of individual signal sources as well as group positions, the accuracy can further be improved. For example, the method may further comprise assessing the validity of the positions of each of the plurality of electromagnetic signal sources, and disregarding any signal sources which are considered invalid. The method may discard points that are unexpectedly far away, for example, since there are practical limits to how far Wi-Fi signals travel.

Processing the group position data to generate position data preferably further comprises generating position accuracy data representing an estimate of the accuracy of the position estimate of the user device. This may be in the form of a 'quality index' (QI), for example. In turn, processing the received signal data to generate group position data may further comprise generating group position accuracy data representing an estimate of the accuracy of the group position data, and wherein the position accuracy data is generated in dependence on the group position accuracy data.

It will be appreciated that, to facilitate the provision of the above method, there may be provided a calibration method for generating data for use with the positioning method as aforesaid, and equivalent user devices, apparatus and systems may further be provided. In particular, a method corresponding to the inverse process of the aforesaid method may be provided for generating WAP and other signal source data.

Accordingly, in another aspect of the invention there is provided a method of estimating the position of an electromagnetic signal source, the method comprising: receiving signal data from the electromagnetic signal source at a plurality of reference locations; dividing the plurality of reference locations into a plurality of groups of the reference locations; processing the received signal data to generate group position data representing the position of at least one group location, each group location being characteristic of the location of a respective group of the reference locations; and processing the group position data to generate position data representing an estimate of the position of the electromagnetic signal source; and outputting (for example to a storage device) the position data. The term 'reference location' may connote essentially any location which is known or estimated, for example using the method as aforesaid or using other methods such as GPS positioning. The step of receiving signal data from the electromagnetic signal source may for example be carried out using the user device as aforesaid or another device, such as a vehicle-mounted "war-driving" rig, or a user-mounted "war-walking" device, and the like.

It will be appreciated that in terms of the geometry and processing of groups, for example, this aspect corresponds essentially to the method of the first aspect but with an electromagnetic signal source (whose position is desired to be estimated) taking the place of the user device, and the plurality of reference locations taking the place of the plurality of electromagnetic signal sources. As a result of this correspondence, where appropriate, features pertaining to the first aspect may be applied to this aspect and vice versa.

To assist in determining the position of the reference locations, the method may further comprise receiving user input data representing an estimated position of the user device.

In a further aspect of the invention there is provided a user device (such as a mobile phone or other hand-held device, with or without external communication capability) comprising a processor, an electromagnetic signal receiver, and a memory containing computer program code that, when executed by the processor in conjunction with the electromagnetic signal receiver, causes the user device to carry out a method as aforesaid.

The memory may further comprise a database containing the known positions of the plurality of electromagnetic signal sources. As noted, the database may instead be remote from the user device.

It will be appreciated that further aspects may be provided, including a system that includes the user device as aforesaid and further apparatus as appropriate to carry out portions of the method as aforesaid at remote locations.

The method may further comprise measuring characteristics of new signal sources and adding data representing said characteristics to an existing database.

Although the embodiments of the invention described above with reference to the drawings comprise methods performed by computer apparatus, and also computer apparatus, the invention also extends to program instructions, particularly program instructions on or in a carrier, adapted for carrying out the processes of the invention or for causing a computer to perform as the computer apparatus of the invention. Programs may be in the form of source code, object code, a code intermediate source, such as in partially compiled form, or any other form suitable for use in the implementation of the processes according to the invention. The carrier may be any entity or device capable of carrying the program instructions.

For example, the carrier may comprise a storage medium, such as a ROM, for example a CD ROM or a semiconductor ROM, or a magnetic recording medium, for example a floppy disc, hard disc, or flash memory, optical memory, and so on. Further, the carrier may be a transmissible carrier such as an electrical or optical signal which may be conveyed via electrical or optical cable or by radio or other means. When a program is embodied in a signal which may be conveyed directly by cable, the carrier may be constituted by such cable or other device or means.

Although various aspects and embodiments of the present invention have been described separately above, any of the aspects and features of the present invention can be used in conjunction with any other aspect, embodiment or feature where appropriate. For example apparatus features may where appropriate be interchanged with method features.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1A:
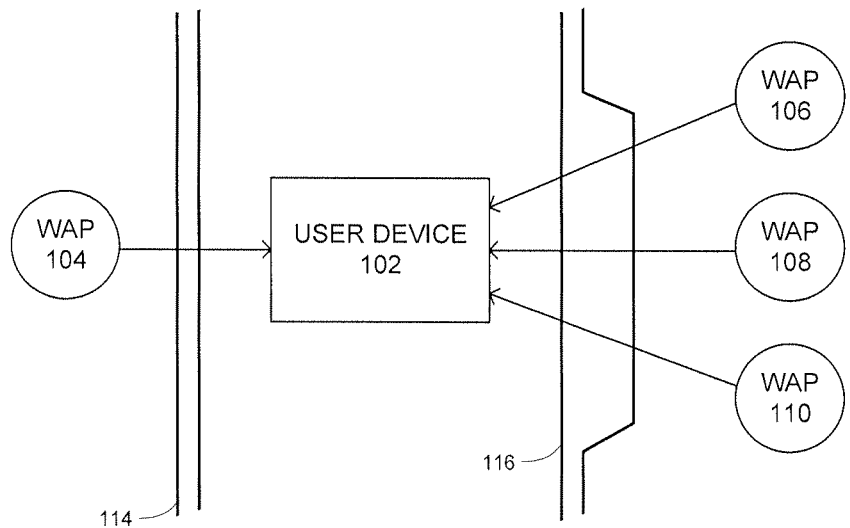
FIGS. 1A and 1B illustrate the problem of biased position estimation in a Wi-Fi positioning system.
Figure 1B:
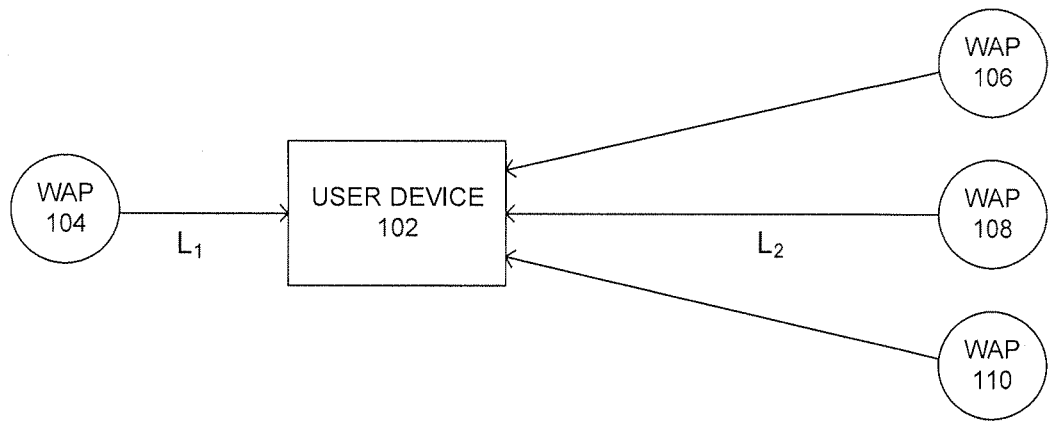
Figure 2:
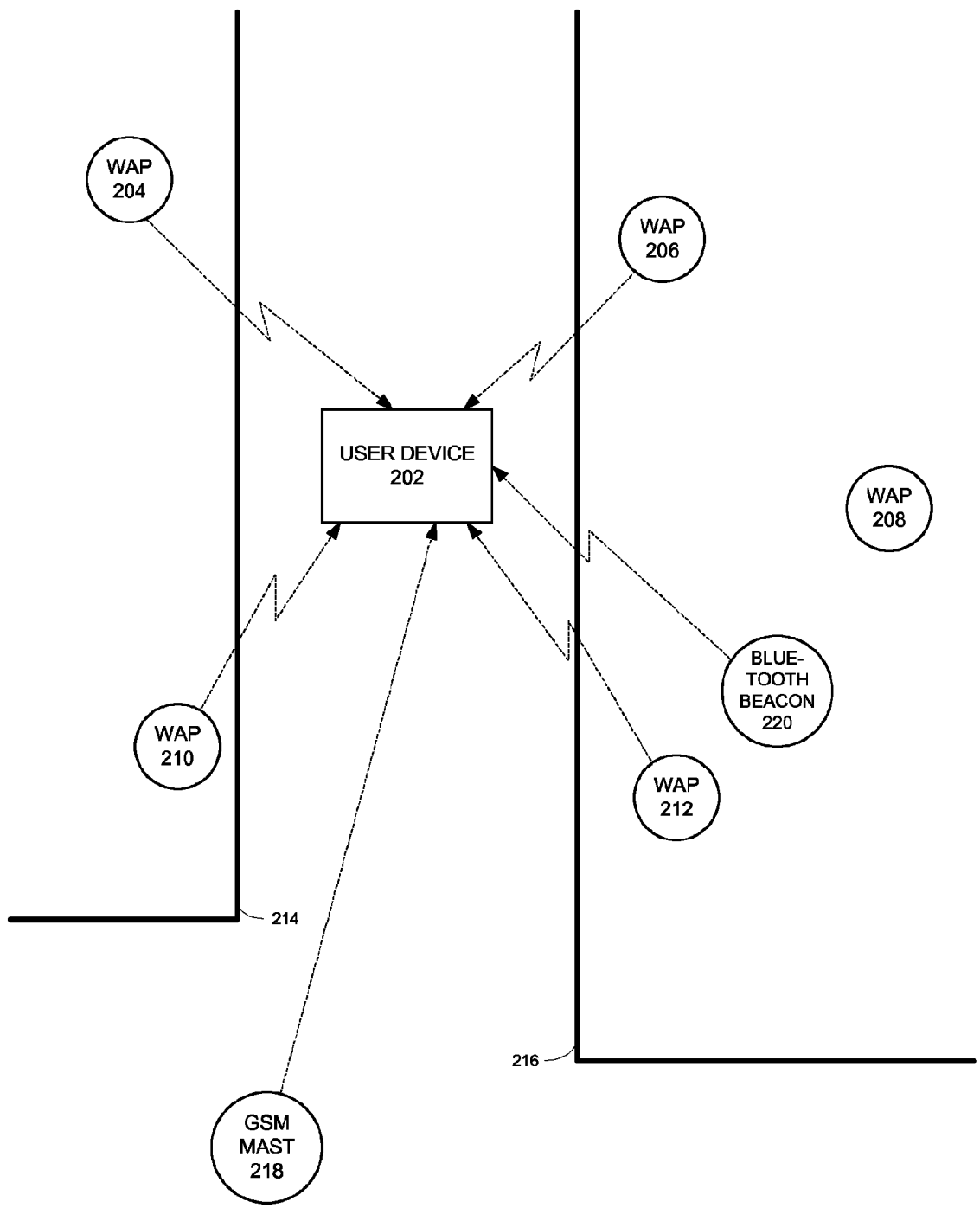
FIG. 2 is an overview of a system for locating a user device using Wi-Fi wireless access point (WAP) signal sources.

FIG. 2 is an overview of a system for locating a user device using Wi-Fi wireless access point (WAP) signal sources. A user device 202 is operated by a user (not shown) and contains a Wi-Fi adaptor (also not shown). A number of wireless access points (WAPs) 204, 206, 208, 210, 212 are located in the immediate vicinity of the user within two buildings 214, 216. Because of signal attenuation, transmission power limits and other factors, only WAPs 204, 206, 210, 212 can be detected by the Wi-Fi adaptor in the user device 202. The WAP 208 is not detected by the user device 202. A GSM (mobile telephone) mast 218 and other signal sources such as a Bluetooth® beacon 220 may also be present, and properties of these and other electromagnetic signal sources may also be measured and used in the location finding system.

As will be explained in more detail later on, the positioning system divides the detected WAPs (or other signal sources) into groups, assigns a 'leader point' to each group, and generates the position estimate using measurements relating to the leader points. It will be appreciated that the principles mentioned below are broadly applicable both to individual WAPs and the leader points mentioned above.

The user device 202 can measure certain characteristics of the signals, either in terms of the signal qualities such as signal strength, angle of incidence, and so on, or in terms of the data carried by the signal, such as the MAC address or other identifier associated with the transmitting WAP.

A number of distance measurements algorithms exist to allow positioning using a Wi-Fi or other comparable system. The algorithms include, for example, Time of Arrival (TOA), Time Difference of Arrival (TDOA), Angle of Arrival (AOA), Received Signal Strength (RSS), and so on. Depending on the technical capabilities of the software, mobile devices and WAPs, the RSS based distance measurement algorithm is normally employed but the other algorithms may also be used as appropriate.

In the RSS algorithm, the strength (power) of a Wi-Fi signal at the receiver (user) is measured in comparison to the transmitted strength of a signal from the radio source (WAP) and is given by following mathematical equation in free space:

$$P_r = \frac{P_t G_t G_r \lambda_2}{(4\pi)^2 d^2} \quad (1)$$

Where $P_r$ is the received power, $P_t$ is a transmitted power, $G_r$ and $G_t$ are receiver and transmitter antenna gains respectively, $\lambda$ is a signal wavelength and d is a distance between source and receiver. This equation can also be represented in terms of propagation gain (PG) as:

$$PG = \frac{P_r}{P_t G_t G_r} = \left(\frac{\lambda}{4\pi d}\right)^2 \quad (2)$$

and in decibels form as:

$$PG_{dB} = 20\log\left(\frac{\lambda}{4\pi d}\right) \quad (3)$$

The free space model (equations) cannot easily be applied in real world environments without modifications because of the signal propagation uncertainties. Wi-Fi signal propagation can be affected by many factors such as signal attenuations and reflections (multipath effects) from the surfaces, building types, moving objects and people, transmission frequency, antenna heights and polarisation, and so on. However, various models exist to try to model different environments and signal propagation behaviour through them to determine the distance between receiver and source. For example, there are models available to predict signal behaviour for different indoor environments. One of the indoor models is described by the following equation:

$$PG_{dB} = 20\log\left(\frac{\lambda}{4\pi d_0}\right) + 10n\log(d_0) + X_\sigma \quad (4)$$

for $$d > d_0$$

Where X, n and $d_0$ are the parameters which vary with different indoor environments and which can be determined empirically. For example, the values of X, n and $d_0$ for a typical hard partitioned office environment are 7.0, 3.0 and 100 respectively.

User input can be provided to select types of environment and then to use specific values of the abovementioned parameters stored in memory (that were for example previous input by the user or other operator). Alternatively, if user inputs are not available default values can be chosen from the software configuration.

There are also models available for outdoor environments for example. One such model, designated as Stanford University Interim (SUI) Model, is described by the following equation:

$$PL = 20\log\left(\frac{4\pi d_0}{\lambda}\right) + 10n\log\left(\frac{d}{d_0}\right) + X_f + X_h + s \quad (5)$$

for $$d > d_0$$

PL is described as path loss and other parameters can be processed similarly as described in for indoor models, that is (for example) either through user inputs or from software configuration.

Once all the distances are determined using any of the models available, they are used to generate an estimate of the position of the user device. Depending on the number of measurements made, various methods are available to form the estimate. One method, triangulation, is described below with reference to FIG. 3.

Figure 3:
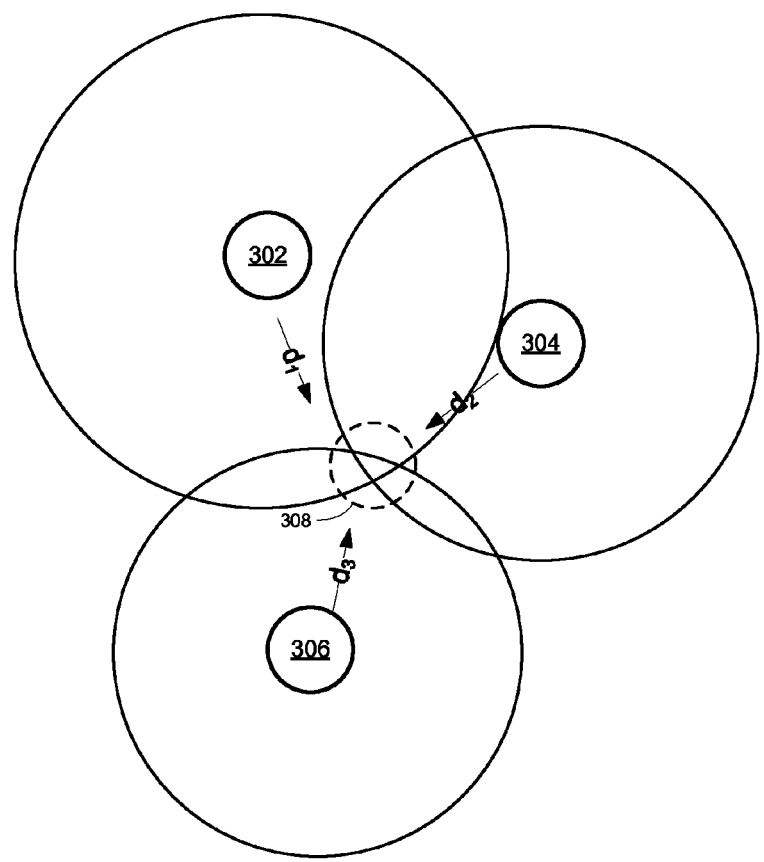
FIG. 3 is an illustration of position estimation by triangulation.

FIG. 3 is an illustration of position estimation by triangulation. A first 302, second 304 and third 306 signal source are shown, each having a known location that has previously been recorded, for example by 'war walking' with a GPS enabled device, or similar. The distances $d_1$, $d_2$ and $d_3$ have been estimated using a suitable method as aforementioned, and an appropriate algorithm selects the most probable intersection 308 of the three lengths, and hence the estimated user location. Due to estimation errors in previous steps, the likely user location 308 is subject to a degree of uncertainty. An appropriate algorithm can be used to select the most suitable estimate.

Figure 4:
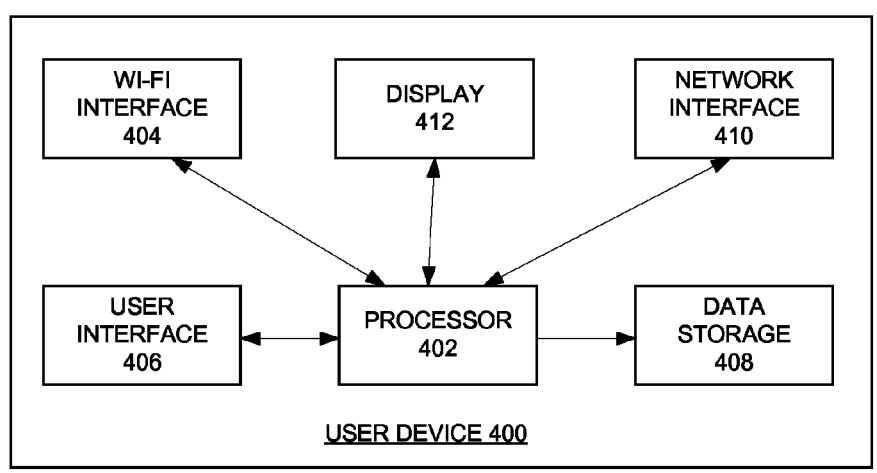
FIG. 4 is an illustration of a user device for use with the system of FIG. 2.

FIG. 4 is an illustration of a user device for use with the system of FIG. 2. The user device 400 includes a processor 402, a Wi-Fi interface 404, a user interface (such as a keyboard and/or touch screen), data storage 408 (including program storage), a network interface 410 (such as a radio for use with a mobile phone network), and a display 412. Depending on the type of device, the network interface 410 or other components of the device may for example be omitted. Further features may of course be provided that are not shown, including further devices and/or interfaces.

Figure 5:
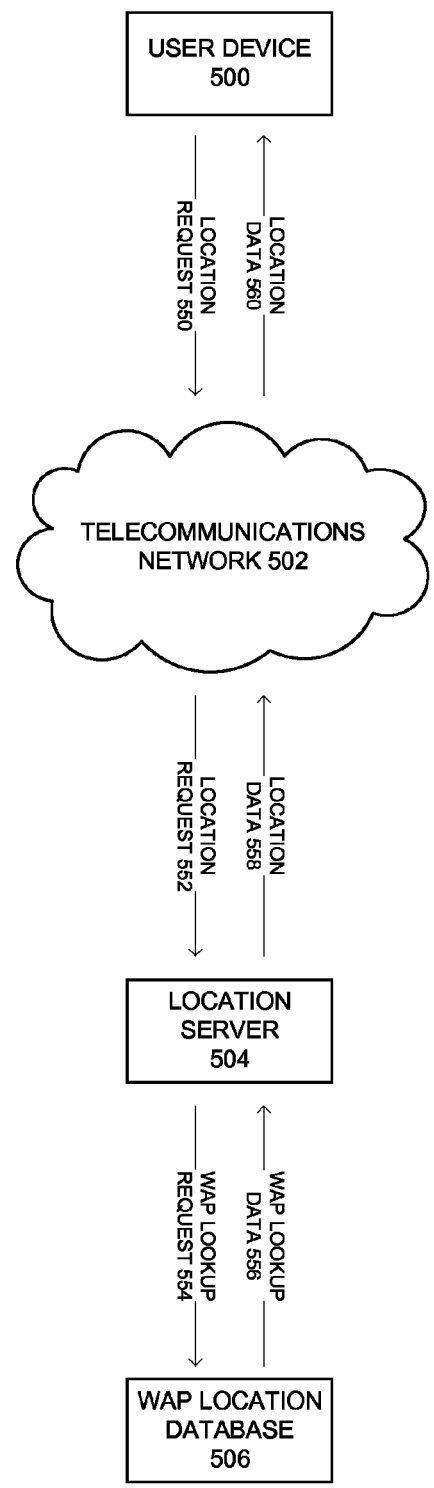
FIG. 5 is an overview of a system for locating a user device, operable with the system of FIG. 2.

FIG. 5 is an overview of a system for locating a user device, operable with the system of FIG. 2.

In FIG. 5 a user device 500 (such as the user device described above or any other device, for example), a telecommunications network (such as a mobile telephone network) 502, a location server 504 and a WAP location database 506 (which may be integrated with the location server 504) are shown.

In use, a user causes the user device 500 to send a location request 550 to the telecommunications network 502 (for example using a service on a mobile telephone). The request 550 typically includes data received at the user device 500, such as properties of signals detected from nearby WAPs. The request 550 may thus, for example, include details of the signal strengths of nearby WAPs and MAC addresses (and/or cell tower signals, and so on).

A request 552 (usually the same as the initial request 550) passes from the network 502 to the location server 504. The location server 504 then processes the request 552 and in so doing interrogates the location database 506 with a WAP lookup request 554, to specify WAP data that is relevant to the location request 552. The database 506 then returns the requested data 556 to the server 504. The server finishes processing the data 556 in conjunction with the received request data 552 to produce a location estimate which is sent back to the user device 500 in the form of location data 558. The network forwards location data 560 (usually the same as the data 558) to the user device 500. The user device can then process the location data 560 to retrieve (and for example display) the location estimate.

In another embodiment, some or all of the components of the system shown in FIG. 5 are provided locally at the user device. Thus the network 502 and any use thereof is not obligatory, for example.

As is mentioned above, the positioning system divides the detected signal sources into a number of groups. This is to simplify aspects of the processing, and to create a more uniform distribution of measured points (relative to measuring the locations of all individual WAPs, which are often disposed in tight clusters). Any number of different methods can be used to divide the WAPs (or other signal sources) into different groups, and generally such methods are effective providing that they generally achieve the same aim (a greater uniformity of distribution of the points which are being measured). In some cases it is appropriate to use a number of different methods at the same time. Two methods will now be described which make use of a 'pilot point', which is effectively a datum point that lies at the centre of the various arrangements of the groups.

Figure 6:
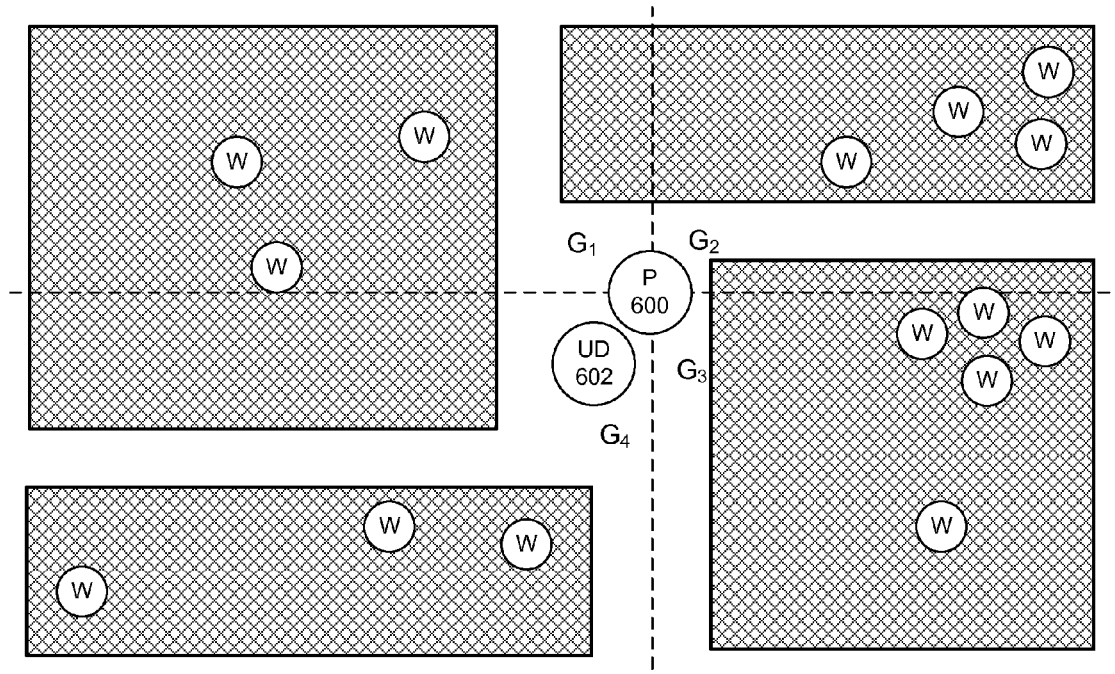
FIG. 6 is an illustration of a first method of dividing a plurality of signal sources into different groups, for use with the system of FIG. 2.

FIG. 6 is an illustration of a first method of dividing a plurality of signal sources into different groups, for use with the system of FIG. 2.

In FIG. 6, various buildings are illustrated schematically by cross-hatching, and a number of WAPs are indicated with the letter 'W'. A pilot point P 600 is shown, as well as an indication of the actual location of the user device UD 602. In this method, horizontal and vertical dividing lines (dashed) intersect at the pilot point 600 and divide the map into four quadrants, forming four distinct groups $G_1, G_2, G_3, G_4$. Since processing is typically carried out using Cartesian coordinates, this method has the benefit of great simplicity and ease and speed of processing to determine the group to which a particular WAP belongs.

It will be appreciated that the pilot point 600 does not (necessarily) coincide with the location of the user device 602. The pilot point 600 is essentially a virtual point which is chosen to ensure a relatively uniform distribution of WAPs around the point. Conveniently it may be chosen (for example) as the mean or median of the coordinates of all of the detected WAPs.

Figure 7:
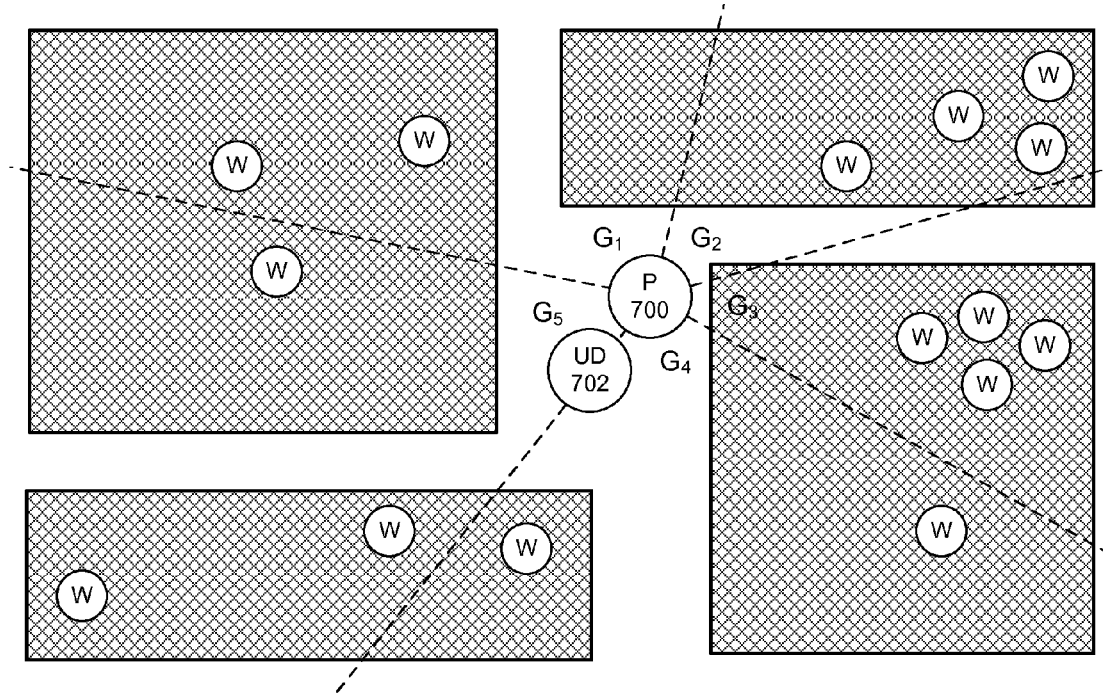
FIG. 7 is an illustration of a second method of dividing a plurality of signal sources into different groups, for use with the system of FIG. 2.

FIG. 7 is an illustration of a second method of dividing a plurality of signal sources into different groups, for use with the system of FIG. 2.

In this method, the pilot point P 700 is chosen as before, and the location of the user device UD 702 is shown for completeness. The buildings and WAPs are present as before. This time, a number of lines are projected radially outward from the pilot point 700 so as to define a number (in this case, 5) of sectors, forming groups $G_1, G_2, G_3, G_4, G_5$. The angles subtended by the radial dividing lines can be chosen to maximise the uniformity of the distribution of WAPs in different groups, for example.

Figure 8:
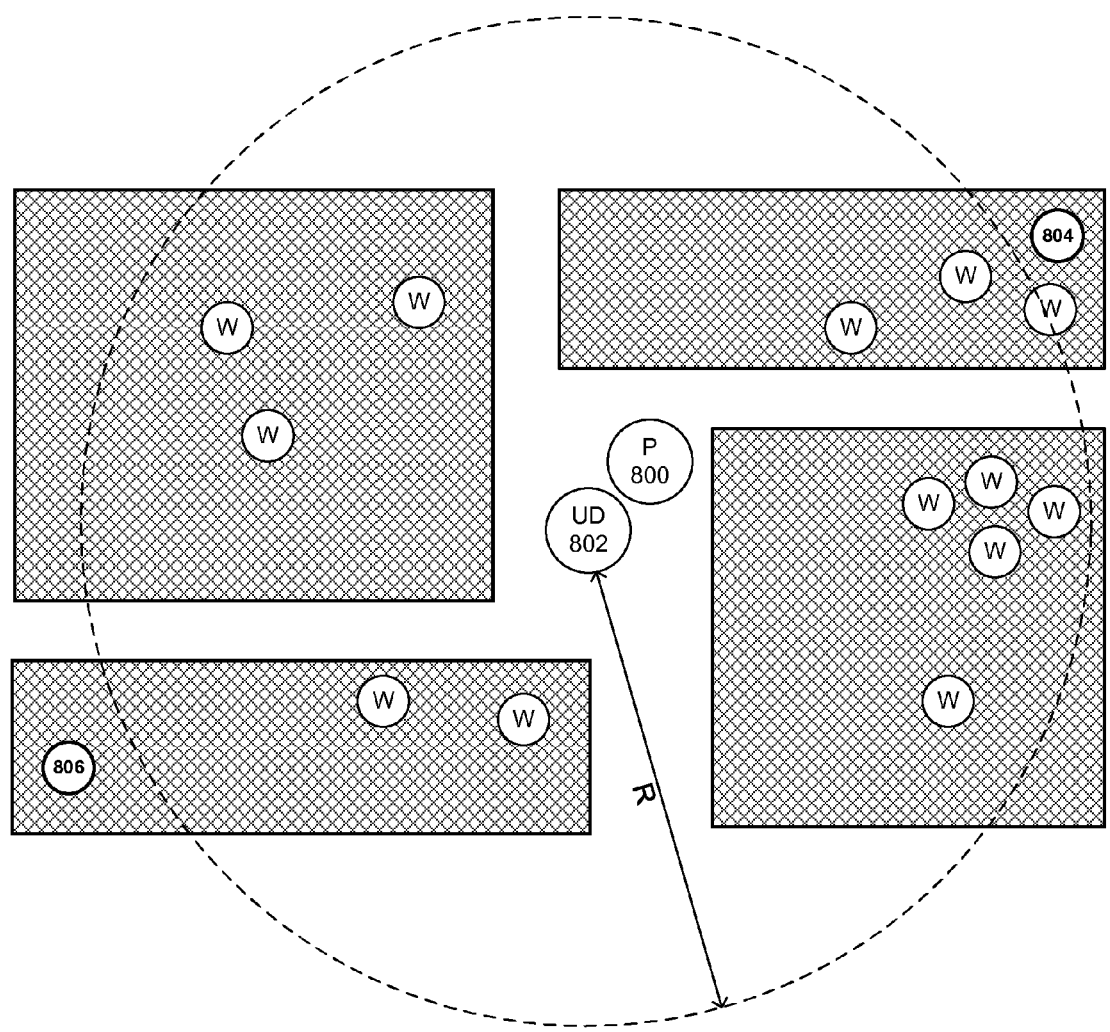
FIG. 8 is an illustration of a method of eliminating invalid signal sources, for use with the system of FIG. 2.

FIG. 8 is an illustration of a method of eliminating invalid signal sources, for use with the system of FIG. 2. This can further refine the position estimate. Again the pilot point P 800 and the user device UD 802 are shown, as well as the various WAPs W. In practice there is a maximum radius R relative to the wireless receiver (in the user device 802) out to which Wi-Fi signals can reliably be received. For example the maximum practical travel distance for Wi-Fi signals is 300 m. There may exist WAP devices 804, 806 which lie outside this distance and which should ideally not contribute to the position estimate, because they appear to be anomalous (invalid) readings. Accordingly, as part of the location process, each of the WAP locations is assessed to see if it is outside the expected radius (or other metric) and discarded if so.

Figure 9:
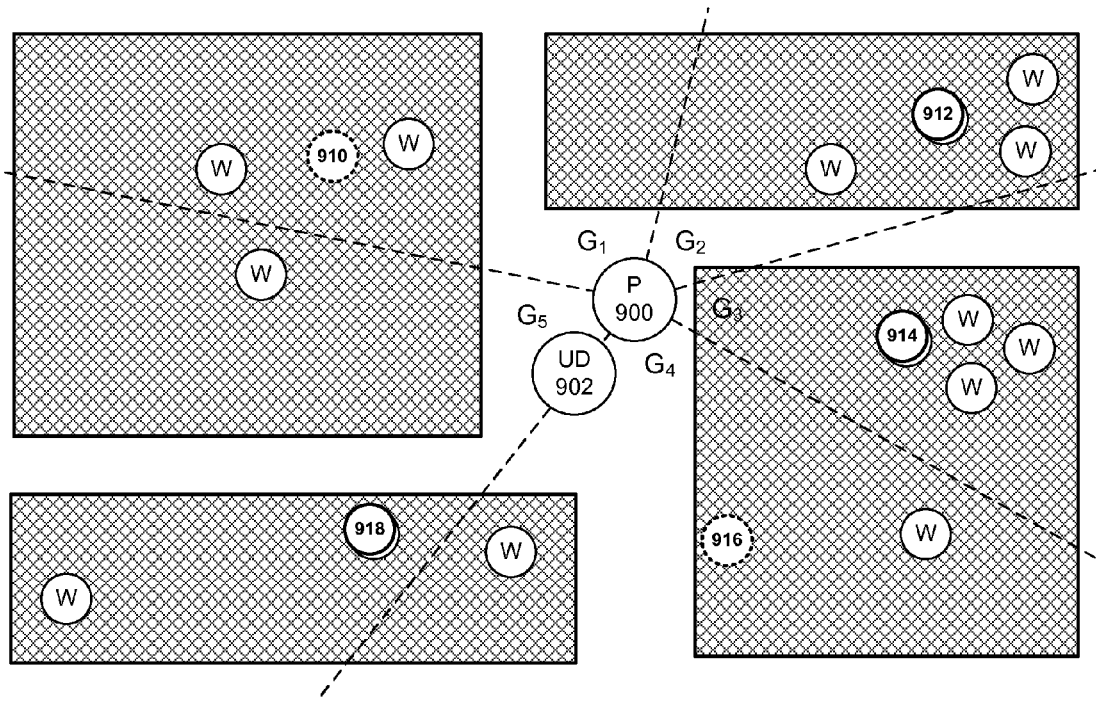
FIG. 9 is an illustration of the selection of leader points for the groups shown in FIG. 7.

FIG. 9 is an illustration of the selection of leader points for the groups shown in FIG. 7.

As mentioned earlier, each group selected in previous steps has a leader point associated with it. This leader point may either be a selected one of the WAPs in the group (for example, the WAP with the strongest signal, greatest availability, or least interference, and so on), or a 'virtual leader point' derived from the location of multiple WAPs in the group (some or all). As before the pilot point 900 and user device 902 are shown. In addition various leader points 910, 912, 914, 916, 918 corresponding to the groups $G_1, G_2, G_3, G_4, G_5$ are shown. Leader points 912, 914, 918 are the 'simple' type, and are merely the locations of single, 'preferred' WAPs within the relevant groups. Leader points 910, 916, however, are the 'virtual' type, and are defined in relation to various of the WAPs in the respective groups. A number of methods can be used to derive the virtual leader points but typically they will be derived from the mean or median coordinates of some or all of the WAPs in the respective group.

The choice of whether to assign a 'real' or 'virtual' leader point to a particular group can be determined in accordance with the particular circumstances. For example, if there is a WAP in a group with clearly superior signal properties, it may make sense to use that as the leader point. In another instance, there may be a dense cluster of similar WAPs with widely varying propagation effects. In this case it may make more sense to use a virtual leader point derived from the mean of the measured coordinates of the individual WAPs, or using an algorithm such as the weighted centroid algorithm (see below).

In variants, more than one leader point may be assigned to each group. In one configuration this provides additional points for use in the computation of the position estimate. In another configuration, the extra leader points are provided as a back up only in case the preferred leader point is not usable.

Figure 10:
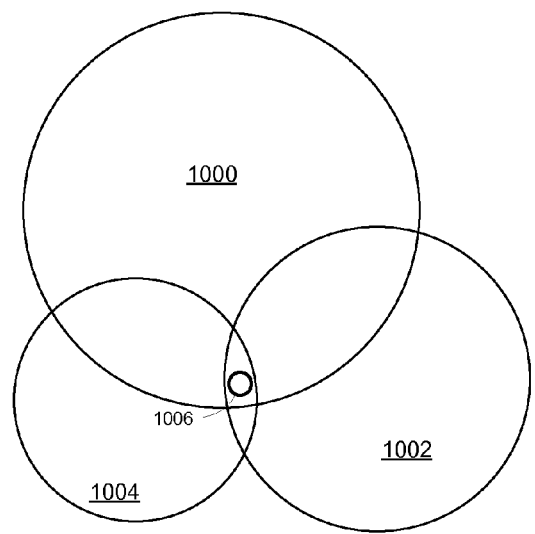
FIG. 10 is an illustration of the application of a weighted centroid algorithm to signal sources in the system of FIG. 2.

FIG. 10 is a very simple illustration of the application of a weighted centroid algorithm to signal sources in the system of FIG. 2. This is an algorithm that can be used to derive a virtual leader point as described above. Three circles 1000, 1002, 1004 correspond to three WAPs having a particular RSSI, which dictates the size of the relevant circle. The weighted average 1006 derived from this algorithm is shown.

A further feature of the positioning system is providing an indicator (a quality index, QI) of the accuracy of the position estimate. As is mentioned above, an important factor in the quality of the estimate is the uniformity of the distribution of WAPs around the user device. The quality index (QI) is computed first for each leader point, and these results are then combined to provide an overall QI associated with the final position estimate.

Figure 11:
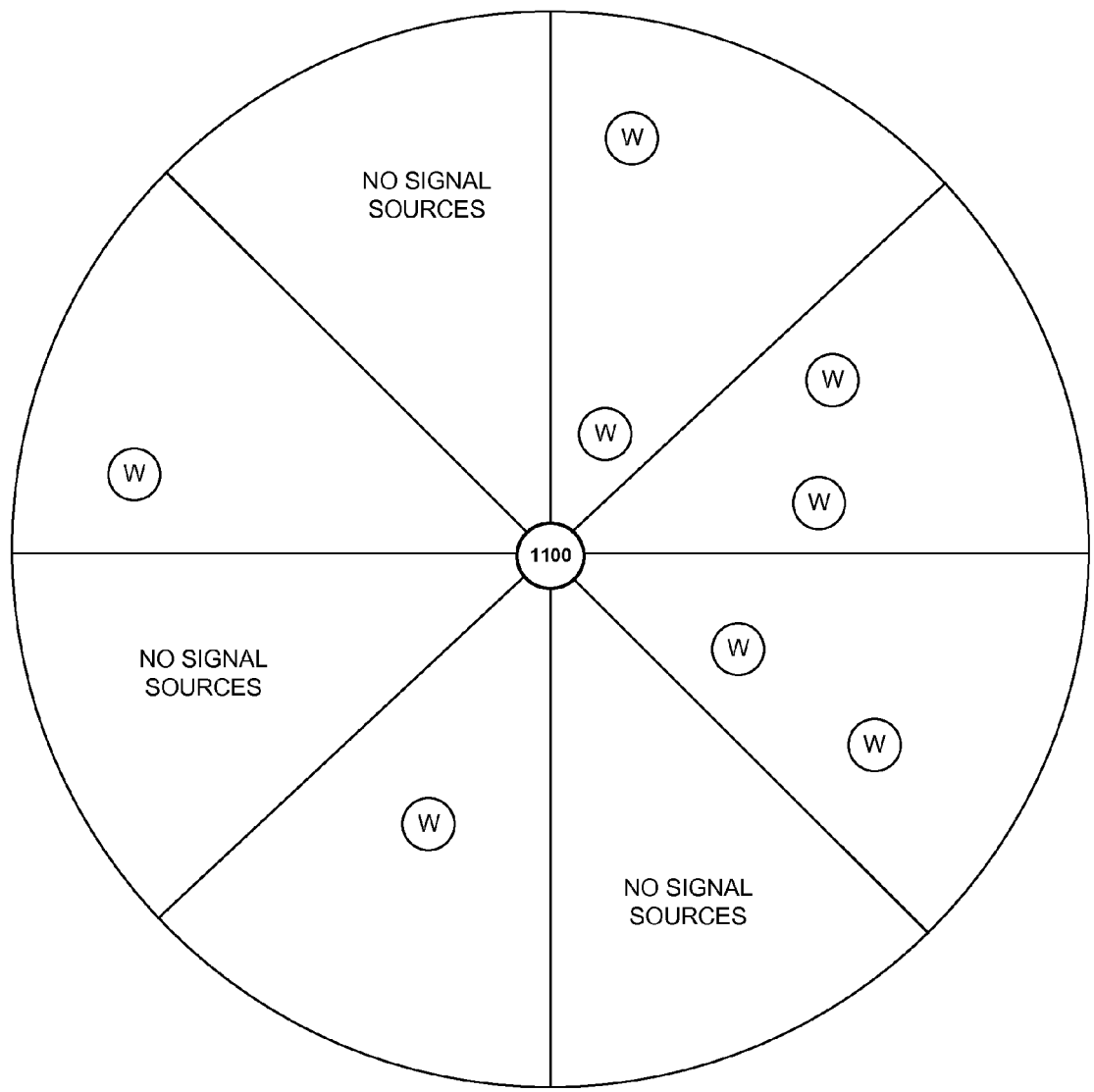
FIG. 11 is an illustration of the calculation of a quality index for a leader point in a group as may be used in the system of FIG. 2.

The importance of the QI parameter appears clearly when storing the virtual calculated reference points, for each group or section, in a database for future use. As each virtual reference point has been calculated to describe the characteristics of all the reference points in the section or group, we should be able to tell the quality of this calculation before using it in the future. FIG. 11 is an illustration of the calculation of a quality index for a leader point 1100 in a group as may be used in the system of FIG. 2.

The calculation process of the Quality Index (QI) is a combination of few parameters describing the signals characteristics and distribution in the target group. To estimate the QI value we have included the following parameters:

N: number of valid reference points in the group or section.
R: the median RSSI for all reference points in the group.
C: the coverage of the reference points around the group leader.
V: the variance RSSI for each section around the leader point Although there are different possible combinations of the above mentioned parameters in calculating QI value, the following example is the currently preferred formula:

$$QI = \frac{C - R \times N}{\sum Vi} \quad (6)$$

Where $V_i$ is the Variance RSSI for the section (i).

The positioning process may also include creating a database record for the QI associated with each leader point. This record maintains the above mentioned parameters in the database in order to assist with future readings (reference points) in the associated group.

Figure 12:
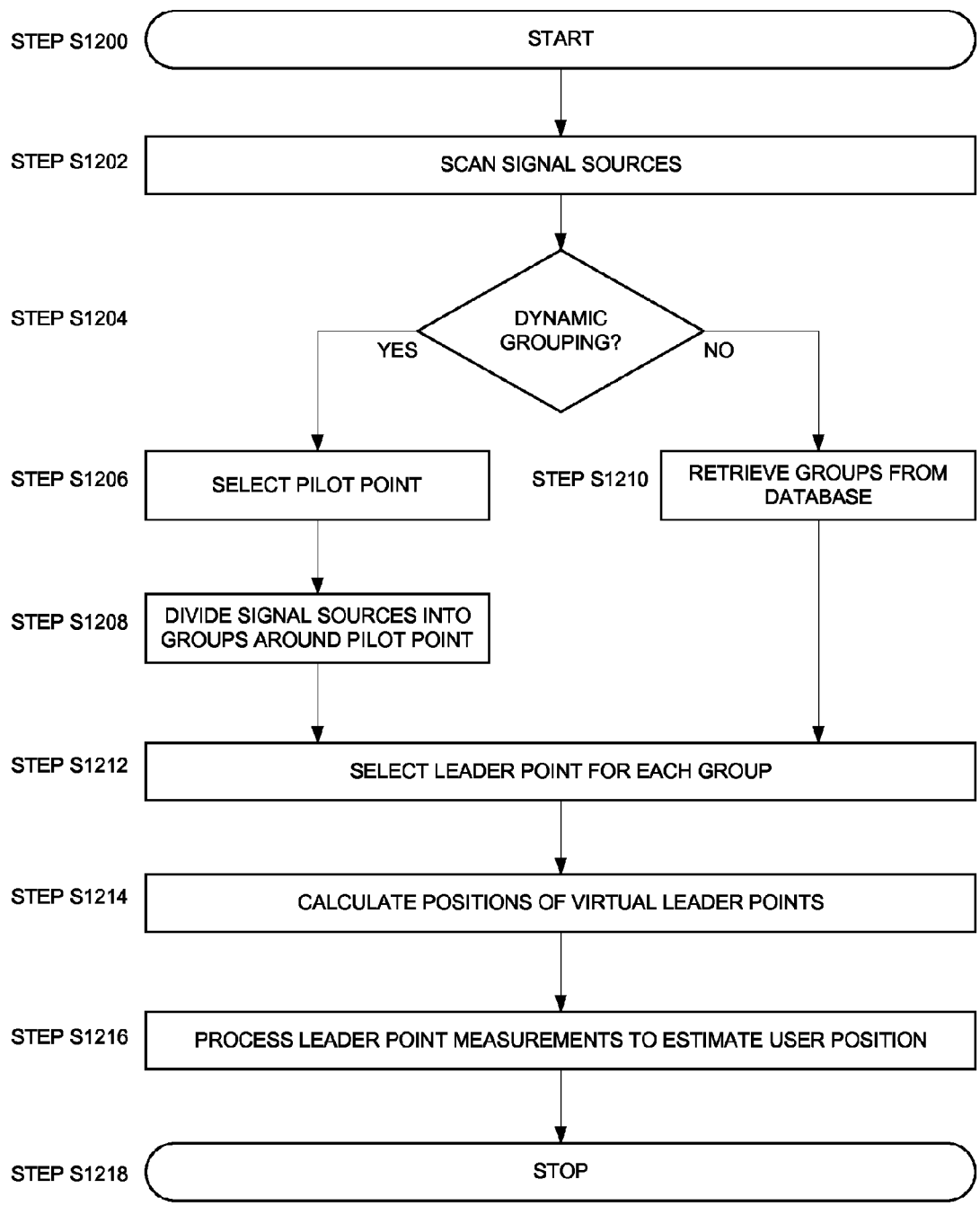
FIG. 12 is a flowchart illustrating the operation of the system of FIG. 2.

FIG. 12 is a flowchart illustrating the operation of the system of FIG. 2.

The process begins in step S1200. In step S1202 the user device carries out a scan of the electromagnetic signal sources in the vicinity, recording for example their unique identifiers and received signal strength (RSS). Depending on whether or not dynamic grouping is used (step S1204), either a pilot point is selected (step S1206) and the signal sources divided dynamically into different groups (step S1208), if so, or the static grouping data is retrieved from a database (step S1210), if not. In step S1212 a leader point is selected for each group. Where necessary, calculations are carried out in respect of the positions of virtual leader points (step S1214), and all of the leader point positions are then processed (step S1216) to generate a final estimate of the position of the user device. The process then ends (step S1218).

The process described above allows the location of a user device with reference to known signal sources, but it will be appreciated that the same process with appropriate modifications can be used to estimate the position of a static signal source. Locating such signal sources is an essential process to enable position requests for any area. This process is called the calibration process. Usually the calibration is started by collecting transmitted signal measurements from a plurality of different reference locations. Then, to locate the signal source, the collected measurements (including signal characteristics and location information data) are processed.

The signal measurements in a plurality of known locations can be considered as reference points with a known position. The reference points are divided into groups depending on the geographical location using an equivalent process to those described above. In one example a Wi-Fi transmitter can be 'mapped' by walking around with a GPS- and Wi-Fi-enabled mobile phone. During the calibration the mobile phone collects the Wi-Fi signals at a predefined rate, creating reference points. Each reference point contains the Latitude/Longitude position as received from the GPS module with the Wi-Fi signal characteristics data received from the specific transmitter. The subsequent process includes:

Calculating a pilot point.
Dividing the measured points into four groups depending on Latitude/Longitude values.
Validating the reference points in each group
Selecting the leader point and the alternative point for each group
Calculating the transmitter position.

The major difference between this approach to locate signal transmitters and the method of estimating the position of a user device is the requirement to store some data. As the transmitters' locations are used as reference points to locate mobile devices, it is preferable to store any available information about these transmitters. The location information and the unique ID of a transmitter are usually enough for the normal positioning system. Although some systems based on fingerprinting store huge amount of calibration data, the modern indoor positioning theory aims to minimise the calibration efforts and data. The aim behind this is to make the indoor positioning system perform globally with reasonable efforts and resources.

Storing all the available calibration data for a geographical location will be useful to filter the transmitter position when new calibration data is received frequently. But it will also consume more storage space, data processing time and data transmission power. Therefore, the dividing method gives the ability to store only the virtual leader reference point for each group. Each leader point is considered as a group representative and would be sufficient to allow filtering to be carried out in respect of future updates.

Predominantly the wireless standard described in this document is Wi-Fi and the positioning system is a Wi-Fi-based system, but this method can equally be applied to other related standards such as Bluetooth and radio-frequency (RF) and other systems. Furthermore this method can also be applied in determining the location of base stations in other communication technologies such as mobile communication (such as GSM and CDMA for example), Wi-Max and so on.

It will be appreciated that other applications of the position location system described above are of course possible, for example including location systems that are entirely local to a user device (for example including all relevant data and processing power in the user device), and devices that communicate via a variety of various different networks (not limited to one or to a telecommunications network, for example).

It will also be appreciated that the positioning method described above can be combined with other positioning methods fully or in part such that, for example, only a portion of the groups of signal sources (or even only one group) may have a corresponding leader point selected or generated as the case may be. In some cases a calculation may be performed in respect of only selected groups at first, and the calculation may cease if a sufficiently accurate result is obtained at that stage, for example.

In summary, a method has been described of determining position co-ordinates of Wireless Access Points (WAPs) in Wireless Local Area Networks (WLANs) using a multiphase self correcting mapping process. The WAPs are typically Wi-Fi Access Points in respective WLANs, but they may be other WAPs of another Wi-Fi based position system. The method and system may be implemented fully on a consumer mobile device, for example, or may rely on remote components and software (such as a central server connected via some form of communications network, such as a Wi-Fi, mobile telephone or other network) to achieve the same aims.

Although the present invention has been described above with reference to specific embodiments, it will be apparent to a skilled person in the art that modifications lie within the spirit and scope of the present invention.

The invention claimed is:

1. A method of estimating the position of a user device, the method comprising:
  receiving signal source data from a plurality of electromagnetic signal sources having known locations;
  dividing the plurality of electromagnetic signal sources into a plurality of groups of the signal sources;
  processing the received signal source data to generate group position data representing the position of at least one group location, each group location being characteristic of the location of a respective group of the signal sources; and
  processing the group position data to generate position data representing an estimate of the position of the user device; and
  outputting the position data,
  wherein at least one of the groups of the signal sources comprises more than one signal source.

2. A method according to claim 1, wherein the group position data represents the position of a plurality of group locations, each group location being characteristic of the location of a respective group of the signal sources.

3. A method according to claim 2, wherein the plurality of electromagnetic signal sources is divided into groups such that the distribution of the plurality of group locations is generally more uniform than the distribution of the plurality of electromagnetic signal sources.

4. A method according claim 1, wherein at least one group location is substantially equivalent to the location of an electromagnetic signal source in the respective group.

5. A method according to claim 1, wherein at least one group location is derived from the locations of a plurality of the electromagnetic signal sources in the respective group.

6. A method according to claim 1, further comprising selecting said at least one group location by accessing stored group data, and selecting said at least one group location from the stored group data.

7. A method according to claim 1, further comprising generating said at least one group location in dependence on the received signal data.

8. A method according to claim 7, wherein generating said at least one group location comprises selecting a datum point and wherein the plurality of signal sources are divided into groups with respect to the datum point.

9. A method according to claim 8, wherein the plurality of signal sources is divided into groups by at least one dividing line passing through the datum point.

10. A method according to claim 8, wherein the plurality of signal sources are divided into groups by a plurality of dividing lines extending radially from the datum point.

11. A method according to claim 8, further comprising selecting the datum point in dependence on user input.

12. A method according to claim 8, further comprising receiving further signal data from a further device in the vicinity of the user device, determining the position of the further device in dependence on the further signal data, and selecting the datum point in dependence on the determined position of the further device.

13. A method according to claim 1, wherein at least one group of signal sources has a plurality of group locations associated with it.

14. A method according to claim 1, further comprising receiving signal source position data representing the position of each of the plurality of electromagnetic signal sources.

15. A method according to claim 14, further comprising assessing the validity of the positions of each of the plurality of electromagnetic signal sources, and disregarding any signal sources which are considered invalid.

16. A method according to claim 1, wherein processing the group position data to generate position data further comprises generating position accuracy data representing an estimate of the accuracy of the position estimate of the user device.

17. A method according to claim 16, wherein processing the received signal data to generate group position data further comprises generating group position accuracy data representing an estimate of the accuracy of the group position data, and wherein the position accuracy data is generated in dependence on the group position accuracy data.

18. A method according to claim 1, wherein each of at least a majority of the groups of the signal sources comprises more than one signal source.

19. A method of estimating the position of an electromagnetic signal source, the method comprising:
  receiving signal data from the electromagnetic signal source at a plurality of reference locations;
  dividing the plurality of reference locations into a plurality of groups of the reference locations;
  processing the received signal data to generate group position data representing the position of at least one group location, each group location being characteristic of the location of a respective group of the reference locations; and
  processing the group position data to generate position data representing an estimate of the position of the electromagnetic signal source; and
  outputting the position data, wherein at least one of the groups of the reference locations comprises more than one reference location.

20. A method according to claim 19, wherein the group position data represents the position of a plurality of group locations, each group location being characteristic of the location of a respective group of the reference locations.

21. A method according to claim 19, wherein the plurality of reference locations is divided into groups such that the distribution of the plurality of group locations is generally more uniform than the distribution of the plurality of reference locations.

22. A method according to claim 19, wherein at least one group location is substantially equivalent to the location of a reference location in the respective group.

23. A method according to claim 19, wherein at least one group location is derived from the locations of a plurality of the reference locations in the respective group.

24. A method according to claim 19, wherein selecting a plurality of group locations comprises accessing stored group data, and selecting the plurality of group locations from the stored group data.

25. A method according to claim 19, wherein selecting a plurality of group locations comprises generating the plurality of group locations in dependence on the received signal data.

26. A method according to claim 25, wherein generating the plurality of group locations comprises selecting a datum point and wherein the plurality of reference locations are divided into groups with respect to the datum point.

27. A method according to claim 26, wherein the plurality of reference locations is divided into groups by at least one dividing line passing through the datum point.

28. A method according to claim 26, wherein the plurality of reference locations are divided into groups by a plurality of dividing lines extending radially from the datum point.

29. A method according to claim 26, further comprising selecting the datum point in dependence on user input.

30. A method according to claim 26, further comprising receiving further signal data from a further device in the vicinity of the electromagnetic signals source, determining the position of the further device in dependence on the further signal data, and selecting the datum point in dependence on the determined position of the further device.

31. A method according to claim 19, wherein at least one group of reference locations has a plurality of group locations associated with it.

32. A method according to claim 19, further comprising receiving reference location data representing the position of each of the plurality of group locations.

33. A method according to claim 32, further comprising assessing the validity of the positions of each of the plurality of reference locations, and disregarding any signal sources which are considered invalid.

34. A method according to claim 19, wherein processing the group position data to generate position data further comprises generating position accuracy data representing an estimate of the accuracy of the position estimate of the electromagnetic signal source.

35. A method according to claim 34, wherein processing the received signal data to generate group position data further comprises generating group position accuracy data representing an estimate of the accuracy of the group position data, and wherein the position accuracy data is generated in dependence on the group position accuracy data.

36. A user device comprising a processor, an electromagnetic signal receiver, and a memory containing computer program code that, when executed by the processor in conjunction with the electromagnetic signal receiver, causes the user device to carry out a method according to claim 1.

37. A user device according to claim 36, wherein the memory further comprises a database containing the known positions of the plurality of electromagnetic signal sources.

38. A computing device comprising a processor and a memory storing computer program code that, when executed by the processor, causes the computing device to carry out a method according to claim 19.

39. A computing device according to claim 38, wherein the memory further comprises a database of the known positions of the plurality of reference locations.

40. A non-transitory computer readable medium tangibly embodying computer program code for causing a computer to carry out a method as claimed in claim 1.

* * * * *